US010791707B2

(12) United States Patent
Van Den Berg (10) Patent No.: US 10,791,707 B2
(45) Date of Patent: Oct. 6, 2020

(54) FEEDING SYSTEM AND METHOD FOR FEEDING NON-HUMAN ANIMALS (71) Applicant: LELY PATENT N.V., Maassluis (NL)

(72) Inventor: Karel Van Den Berg, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 494 days.

(21) Appl. No.: 15/533,740

(22) PCT Filed: Dec. 14, 2015

(86) PCT No.: PCT/NL2015/050865
§ 371 (c)(1),
(2) Date: Jun. 7, 2017

(87) PCT Pub. No.: WO2016/111614
PCT Pub. Date: Jul. 14, 2016

(65) Prior Publication Data
US 2017/0325422 A1 Nov. 16, 2017

(30) Foreign Application Priority Data

Jan. 8, 2015 (NL) ...................................... 2014096

(51) Int. Cl.
*A01K 5/02* (2006.01)
*A01K 5/00* (2006.01)
*A01K 5/01* (2006.01)

(52) U.S. Cl.
CPC ............ *A01K 5/0266* (2013.01); *A01K 5/001* (2013.01); *A01K 5/004* (2013.01); *A01K 5/0107* (2013.01); *A01K 5/0208* (2013.01)

(58) Field of Classification Search
CPC . A01K 5/00; A01K 5/002; A01K 5/02; A01K 5/0275; A01K 5/0208;
(Continued)

(56) References Cited

U.S. PATENT DOCUMENTS 3,021,025 A * 2/1962 Sudenga ................ B65G 33/14
414/505
3,628,506 A * 12/1971 Glasbergen .............. A01K 9/00
119/61.2
(Continued)

FOREIGN PATENT DOCUMENTS

DE 41 31 329 A1 3/1993
NL 2009410 C 3/2014
(Continued)

OTHER PUBLICATIONS

Jeantil : le robot d'alimentation Automatic Feeding en action; https://www.youtube.com/watch?v=eZRowLjlyXw; Sep. 23, 2014 (Year: 2014).*
(Continued)

*Primary Examiner* — Ebony E Evans
(74) *Attorney, Agent, or Firm* — Birch, Stewart, Kolasch & Birch, LLP (57) ABSTRACT

A feeding system to feed non-human animals includes a first autonomous mobile device and a second autonomous mobile device. The first autonomous mobile device includes a feed holder to receive feed, a feed mixer to mix the received feed, and a feed dispenser configured to dispense feed to the second autonomous mobile device. The second autonomous mobile device includes a feed holder to receive feed from the first autonomous mobile device.

15 Claims, 5 Drawing Sheets

(58) Field of Classification Search
CPC ...... A01K 5/0107; A01K 5/004; A01K 5/001; A01K 5/0266; A01K 1/0128
USPC .................................................. 119/57.92
See application file for complete search history.

(56) References Cited

U.S. PATENT DOCUMENTS

| | | | | |
|---|---|---|---|---|
| 4,174,740 A * | 11/1979 | Tobler | ............... | B28C 7/06 141/1 |
| 4,981,107 A * | 1/1991 | Beaudoin | ............. | A01K 5/0208 119/56.2 |
| 5,355,833 A * | 10/1994 | Legrain | ............... | A01K 9/00 119/51.02 |
| 5,659,779 A * | 8/1997 | Laird | ............... | B61L 27/04 700/245 |
| 5,816,192 A * | 10/1998 | van der Lely | ........... | A01K 5/00 119/57.92 |
| 6,263,833 B1 * | 7/2001 | Runyan | ............... | A01K 5/00 119/51.11 |
| 7,591,630 B2 * | 9/2009 | Lert, Jr. | ............... | B65G 1/0492 414/807 |
| 7,689,434 B2 * | 3/2010 | Cureton | ............... | A01K 5/02 705/1.1 |
| 9,039,340 B2 * | 5/2015 | Van Mill | ............... | A01F 12/46 414/526 |
| 9,265,230 B2 * | 2/2016 | Van Aalst | ............... | E04H 17/02 |
| 9,272,853 B2 * | 3/2016 | Van Mill | ............... | B65G 67/04 |
| 9,469,208 B2 * | 10/2016 | Dorval | ............... | B60L 11/1824 |
| 9,522,811 B2 * | 12/2016 | Van Kuilenburg | .. | A01K 5/0266 |
| 9,718,352 B2 * | 8/2017 | Richter | ............... | B60K 1/00 |
| 9,924,699 B2 * | 3/2018 | Wisse | ............... | A47L 9/009 |
| 10,136,616 B2 * | 11/2018 | Van Den Berg et al. | ............... | A01K 5/004 |
| 10,172,322 B2 * | 1/2019 | Ruizenaar | ............... | A01K 5/02 |
| 10,231,441 B2 * | 3/2019 | Horton | ............... | A01K 5/01 |
| 2003/0175102 A1 * | 9/2003 | Cresswell | ............... | B60P 1/42 414/523 |
| 2010/0326363 A1 * | 12/2010 | Van Den Berg | ............... | A01K 1/105 119/57.92 |
| 2011/0261641 A1 * | 10/2011 | Barbi | ............... | A23N 17/007 366/141 |
| 2013/0073137 A1 * | 3/2013 | Van Den Berg | ............... | G05D 1/021 701/23 |
| 2015/0230427 A1 | 8/2015 | Wisse et al. | | |
| 2016/0323519 A1 * | 11/2016 | Boydens | ............... | A01D 43/087 |
| 2017/0055446 A1 * | 3/2017 | Nykamp | ............... | A01D 43/073 |
| 2018/0116166 A1 * | 5/2018 | Van Den Berg | ............... | A01K 1/10 |

FOREIGN PATENT DOCUMENTS

| | | |
|---|---|---|
| WO | WO 2013/157928 A1 | 10/2013 |
| WO | WO 2013/157931 A1 | 10/2013 |

OTHER PUBLICATIONS

International Search Report, issued in PCT/NL2015/050865, dated Apr. 7, 2016.
Lely, "Lely Vector Brochure", Internet Citation, Jul. 9, 2014, XP00272688, Retrieved from the Internet: URL:http://www.lely.com/en/feeding/automatic-feeding-system/vector, 32 pages, p. 9.
Written Opinion of the International Searching Authority, issued in PCT/NL2015/050865, dated Apr. 7, 2016.

* cited by examiner

FEEDING SYSTEM AND METHOD FOR FEEDING NON-HUMAN ANIMALS

The invention relates to a feeding system and a method for feeding non-human animals, in particular livestock and more in particular cows.

In a dairy farm taking care of feeding the animals, i.e. the cows, is an important daily routine. This daily routine takes a lot of time when performed by a person. In order to save time and effort for the farmer, automatic feeding systems like the Lely Vector™ automatic feeding system may be used which, when employed, take care of most tasks within the routine.

Although such systems work fine to automatically prepare feed to be delivered to the animals without the constant assistance of a person, i.e. the farmer, it has been found that the feed delivery device in some circumstances may not be able to deliver feed to all feeding locations, especially when the feeding locations are for a small group of animals or even individual animals. Also it is not possible to prepare specific rations for single animals or small groups in the known systems without creating a lot of waste.

It is thus an object of the invention to provide an improved feeding system which can feed small groups of animals or even individual animals.

This object is achieved by claim 1 and provides a feeding system to feed non-human animals, comprising a first autonomous mobile device and a second autonomous mobile device, wherein the first autonomous mobile device includes:
 a feed holder to receive feed;
 a feed mixer to mix the received feed; and
 a feed dispenser configured to dispense feed to the second autonomous mobile device,
and wherein the second autonomous mobile device includes a feed holder to receive feed from the first autonomous mobile device.

An advantage of providing two autonomous mobile devices is that the first device can mix feed and dispense into the second device which can then transport the feed to a location for feeding animals.

By providing two autonomous mobile devices the devices can be provided with different characteristics solving the problem of a prior art feed delivery device not being able to deliver feed to all feeding locations, caused by the prior art feed delivery device being either too large or heavy to reach all feeding locations and/or the minimum amount that can be mixed and delivered by the prior art feed delivery device being too large for the feeding location.

In an embodiment, the second autonomous mobile device comprises a feed dispenser to dispense feed at one or more feeding locations. This allows to actively remove the feed from the feed holder of the second autonomous mobile device resulting in the second autonomous mobile device being free to perform another feeding action. In case the second autonomous mobile device does not comprise a feed dispenser or similar device, the feed has to be removed by the animals themselves while eating. This may be advantageous when only one feeding location needs to be serviced by the second autonomous mobile device, but when more feeding locations have to be serviced by the second autonomous mobile device, a feed dispenser may be preferred.

In an embodiment, the feed dispenser of the first autonomous mobile device is configured to dispense feed at one or more feeding locations. This may have the same advantages as described for the second autonomous mobile device.

The first autonomous mobile device may be configured to deliver feed at a first group of feeding locations, wherein the second autonomous mobile device is configured to deliver feed to a second group of feeding locations, and wherein the first and second group of feeding locations are different.

This is especially advantageous when the first autonomous mobile device is not able to deliver feed at the second group of feeding locations, e.g. due to its size or weight or the presence of obstructions.

An example of a situation in which the first autonomous mobile device is not able to deliver feed at a second group of feeding locations is when the first autonomous mobile device is too large to reach the second group of feeding locations, for instance due to a small or narrow gangway leading to the second group of feeding locations.

Hence, in such a situation it is preferred that the second autonomous mobile device is smaller than the first autonomous mobile device. This allows the second autonomous mobile device to reach feeding locations where the available maneuvering space is too small for the first autonomous mobile device.

In an embodiment, the first autonomous mobile device comprises a feed grabber to grab feed in order to fill the feed holder of the first autonomous mobile device. Hence, the first autonomous mobile device is able to fill the feed holder itself without requiring additional equipment. The feed may be stored in a feed storage, so that the first autonomous mobile device is configured to drive to the feed storage, grab the feed with the feed grabber and fill the feed holder with the grabbed feed.

In an embodiment, the feed system further comprises a feed storage location, a feed discharge location and a feed preparation device, wherein the feed preparation device is configured to deliver feed from the feed storage to the feed discharge location to fill the first autonomous mobile device.

The first autonomous mobile device is thus configured to drive to the feed discharge station to be filled with feed by the feed preparation device that provides said feed from the feed storage location.

In an embodiment, the first and the second autonomous mobile device each comprise a respective communication device to communicate with each other. This allows the second autonomous mobile device to send a feed request to the first autonomous mobile device and allows the first autonomous mobile device to respond, for instance by indicating when the requested feed is prepared and ready to be delivered to the second autonomous mobile device.

The communication devices may be part of a control system for controlling the first and second autonomous mobile device.

In an embodiment, the second autonomous mobile device comprises a feed additive supplying device to supply feed additives to the feed. The feed additives may comprise concentrated feed, minerals, etc. that may be added to the feed provided by the first autonomous mobile device depending on the animals that are fed.

In an embodiment, the feed dispenser of the second autonomous mobile device comprises an endless belt conveyor. This endless belt conveyor allows to transport feed in a horizontal direction, but also in a vertical direction at the same time as well, which is advantageous to reach feeding locations that are at a distance from the floor.

In an embodiment, the first autonomous mobile device is configured to deliver feed on the floor at one or more feeding locations, and the second autonomous mobile device is configured to deliver feed in mangers or food trays at one or more feeding locations.

At least a portion of the endless belt conveyor can also be used as feed holder. Hence, feed from the first autonomous mobile device is delivered onto the endless belt conveyor, so that subsequent operation of the endless belt conveyor dispenses feed from the second autonomous mobile device.

In an embodiment, the feed dispenser of the second autonomous mobile device is moveably arranged on the second autonomous mobile device to provide a variable dispensing location for said feed dispenser that can be adapted to the position of a feeding location. Hence, mistakes in positioning the second autonomous mobile device or circumstances in which the second autonomous mobile device is not able to reach a desired position can be compensated for by the moveable feed dispenser of the second autonomous mobile device thereby still allowing to deliver feed at a feeding location.

The invention also relates to a method for feeding non-human animals, comprising the following steps:
a. providing a first autonomous mobile device including a feed holder, a feed mixer, and a feed dispenser;
b. providing a second autonomous mobile device including a feed holder;
c. filling the feed holder of the first autonomous mobile device with feed;
d. mixing the feed received in the feed holder of the first autonomous mobile device using the feed mixer; and
e. dispensing the mixed feed from the first autonomous mobile device to the feed holder of the second autonomous mobile device using the feed dispenser.

In an embodiment, filling the feed holder of the first autonomous mobile device with feed comprises the following sub-steps:
c1. moving the first autonomous mobile device to a predetermined filling location;
c2. grabbing feed using a feed grabber of the first autonomous mobile device to fill said feed holder or receiving feed from a feed preparation device.

In an embodiment, the method further includes the step of dispensing mixed feed from the first autonomous mobile device at one or more feeding locations using the feed dispenser of the first autonomous mobile device.

In an embodiment, the second autonomous mobile device comprises a feed dispenser, wherein the method further includes the step of dispensing feed from the second autonomous mobile device at one or more feeding locations using said feed dispenser.

In an embodiment, the feed dispenser of the first autonomous mobile device delivers feed at a first group of feeding locations, wherein the feed dispenser of the second autonomous mobile device delivers feed to a second group of feeding locations, and wherein the first and second group of feeding locations are different.

In an embodiment, the method further comprises the steps:
sending a feeding request from the second autonomous mobile device to the first autonomous mobile device;
sending a response to the feeding request from the first autonomous mobile device to the second autonomous mobile device indicating that the requested feed has been prepared by the first autonomous mobile device; and
moving the first and/or second autonomous mobile device until they meet each other for dispensing the mixed feed from the first autonomous mobile device to the feed holder of the second autonomous mobile device.

In an embodiment, the method further comprises the steps:

sending a notification from the first autonomous mobile device to the second autonomous mobile device that feed has been prepared by the first autonomous mobile device;
sending a response to the notification from the second autonomous mobile device to the first autonomous mobile device indicating that the second autonomous mobile device would like to receive feed from the first autonomous mobile device; and
moving the first and/or second autonomous mobile device until they meet each other for dispensing the mixed feed from the first autonomous mobile device to the feed holder of the second autonomous mobile device.

The invention will now be described by reference to the accompanying drawings in which like parts are indicated using like reference symbols, and in which.

Figure 1:
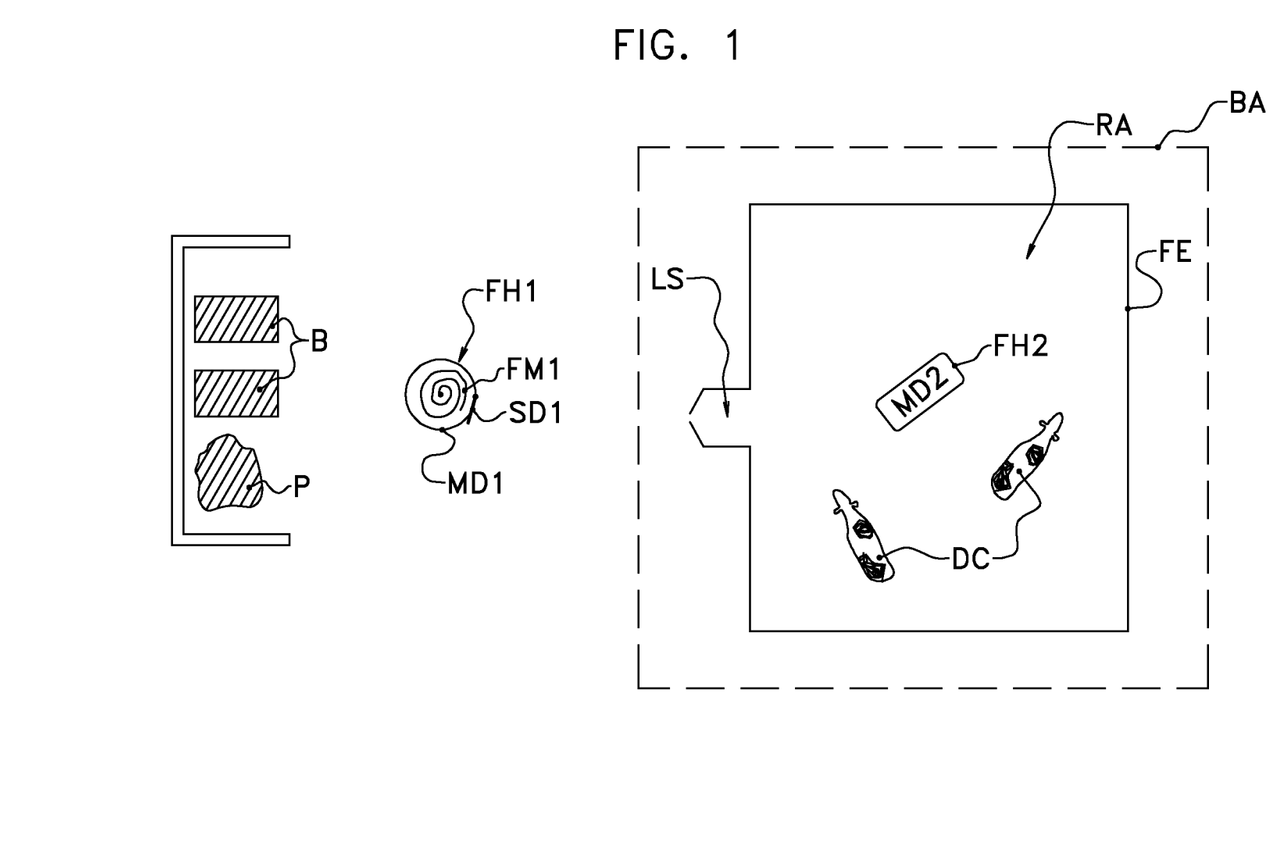
FIG. 1 depicts a schematic top view of a farm with a feeding system according to an embodiment of the invention.

FIG. 1 depicts a schematic top view of a feeding system according to an embodiment of the invention. In this embodiment, the invention is applied to a dairy farm comprising an open living area such as a bedded pack barn BA for dairy cattle. Such a barn BA is usually characterized by a large, open resting area RA where animals, in this case dairy cows DC, are free to move around and rest. The resting area RA is delimited by a fence FE to keep the animals DC within the resting area RA.

Although only two animals are shown in FIG. 1, the size of the barn may easily be such that a herd of dairy animals, e.g. 60-150 animals, can be held within the barn. For this embodiment, we assume that the animals are managed and housed in a single resting area, but the invention also applies to management of multiple groups. It is also possible to have more then one resting areas in a single barn.

Also shown in FIG. 1 is a feed storage FS where feed is temporarily stored, e.g. in the form of bales B and/or a pile of feed P. In order to keep the feed fresh or as fresh as possible, the feed may initially be stored in a long term storage like a silo and subsequently transported, e.g. as bales, to the feed storage FS.

To feed the animals DC in the barn BA, a feeding system is provided comprising a first autonomous mobile device MD1 and a second autonomous mobile device MD2. In the remainder of this description, the first autonomous mobile device MD1 may also be referred to as first mobile device and the second autonomous mobile device MD2 may also be referred to as second mobile device.

The first mobile device MD1 comprises a feed holder FH1 to receive feed. The feed holder FH1 as shown has a container-like structure with an open top end to receive the feed. The first mobile device MD1 further comprises a feed mixer FM1 to mix feed received in the feed holder. Shown as the feed mixer FM1 is a vertical auger or screw positioned inside the feed holder FH1, the feed mixer FM1 is schematically indicated by a spiral shape in this top view.

The first mobile device MD1 further comprises a feed dispenser configured to dispense feed to the second mobile device MD2 as will be explained in more detail below.

The feed dispenser in this embodiment is a combination of the feed mixer FM1 and a side door SD1 in the feed holder FH1. The feed mixer FM1 will not only mix the feed, but will also aid in transporting it downwards in the feed holder and may move the mixed feed radially outward due to centrifugal forces. These characteristics of this feed mixer FM1 can advantageously be used to dispense feed from the feed holder FH1 when the side door SD1 is opened. When the side door SD1 is closed, the feed mixer FM1 is only able to mix the feed inside the feed holder FH1.

Figure 2:
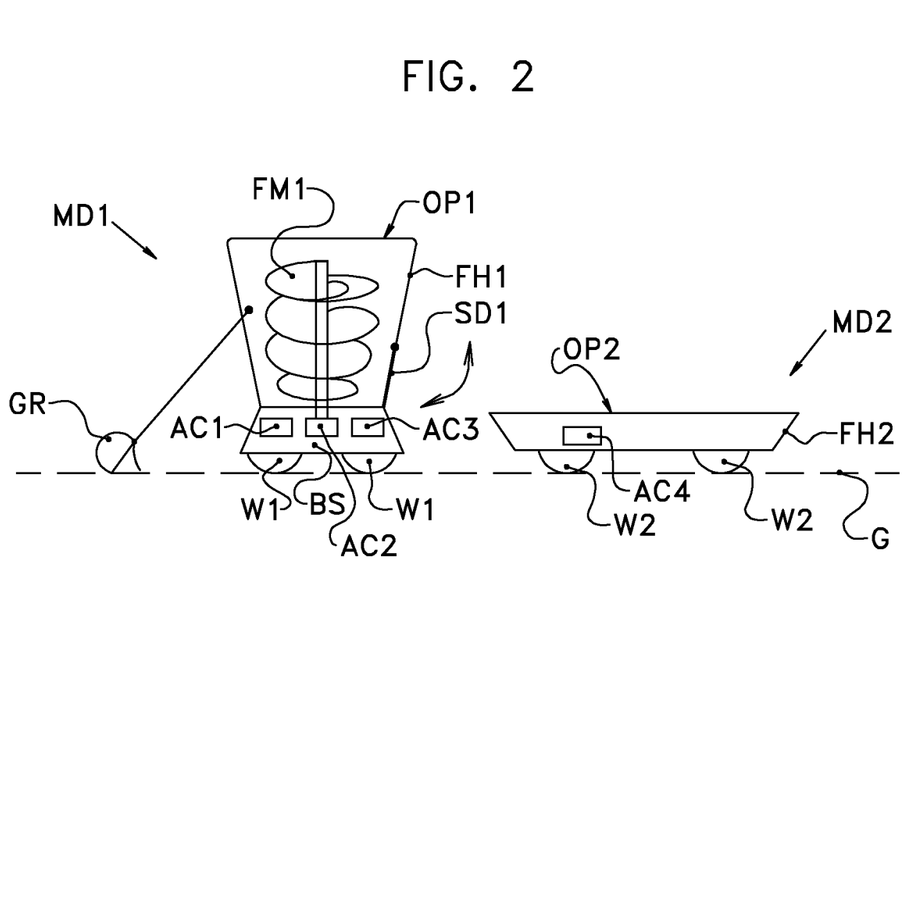
FIG. 2 depicts a schematic side view of the first and second autonomous mobile device of the feeding system of FIG. 1.

Feed may be introduced into the feed holder FH1 of the first mobile device MD1 manually by a person, by using a grabber GR (that is an integral part of the first mobile device MD1 (as is shown in FIG. 2), by using a separate feed preparation device configured to grab feed at the feed storage and discharge this feed into the feed holder FH1 of the first mobile device MD1, or other feed loading means.

As mentioned above the first mobile device MD1 is autonomous, which means that it in principle operates without being actively controlled by a person. The first mobile device MD1 may therefore comprise a control system and an actuation system (not shown in FIG. 1), wherein the actuation system is controlled by the control system.

The actuation system comprises actuators to move, position or operate components of the first mobile device MD1. For instance, there may be provided an actuator to move the entire first mobile device, an actuator to rotate the feed mixer FM1 and/or an actuator to open the side door SD1.

When the first mobile device comprises a grabber, the actuation system may also comprise an actuator to operate the grabber. The control system may comprise pre-programmed instructions determining the behaviour of the first mobile device. The control system may for instance comprise a time schedule and a timer to determine when feed is to be prepared and delivered to the animals. When the control system determines that feed needs to be prepared, the first mobile device MD1 will automatically drive towards the feed storage and, using its grabber, fill the feed holder FH1 with the required amount and type of feed.

In case the first mobile device MD1 does not include a grabber to fill the feed holder itself, the control system may send a feed request to a person in case of manually filling of the feed holder or to a feed preparation device in case the feed preparation device is used to fill the feed holder. Once the control system receives a signal indicating that the feed holder has been filled with feed, the first mobile device will continue the process by mixing the feed in the feed holder and dispensing the mixed feed from the first mobile device.

The resting area RA of the bedded pack barn is commonly bedded with bedding material such as e.g. sawdust or dry, fine wood shavings, or with compostable biomaterial or with other bedding material. The bedded material forms a relatively non-flat and soft floor which is not suitable to for heavy machinery. The first mobile device MD1, due to the feed mixer FM1 and desired capacity of the feed system, generally is a bulky and heavy machine, and as such not particularly suitable to drive on the bedded material of the resting area. Similarly it is undesirable to have a feed fence because the area's of the resting area (RA) near such a feed fence will be visited a lot by the dairy animals and become so-called 'heavy traffic' area's. The 'heavy traffic' area's near the feed fence would suffer more pollution then in other areas of the resting area and require more maintenance.

The feeding system therefore comprises a second autonomous mobile device MD2 to cooperate with the first mobile device MD1. The second mobile device comprises a feed holder FH2 to receive feed from the first mobile device MD1. The second mobile device MD2, in this embodiment, thus lacks a feed mixer and a feed dispenser and can is made suitable for traveling within the resting area. Once inside the resting area RA the second mobile device MD2 functions as a feeding bunk to the animals and can eat from the second mobile device. It can regularly move to a different part of the resting area and thus distribute the animal traffic and prevent 'heavy traffic' area's from occurring.

Hence, the first mobile device is used for mixing the feed, i.e. preparing the feed to be delivered to the animals DC. The combination of two mobile devices has the advantage that feeding can be done faster. This is because when the second mobile device is still filled with feed, the first mobile device can already start preparing the next amount of feed to be delivered to the second mobile device, and is able to already travel to a site near the resting area RA. In this embodiment, the second mobile device when (nearly) empty can move to a loading site LS, which is a location where the second mobile device can meet the first mobile device to exchange feed. As the second mobile device only has to travel over a small distance to receive a next amount of feed, feeding can be done very quickly.

Another advantage may be that the first mobile device may be able to deliver feed to other feeding locations while the second mobile device is feeding the animals in the resting area. Typically the other feeding locations will not be bedded pack areas. Hence, the first and second mobile device may deliver feed in parallel, which also makes the feeding process very quick. For this embodiment, the feed dispenser of the first mobile device is configured to dispense feed at one or more feeding locations. These feeding locations may be located outside fenced areas, such that the first mobile device dispenses feed on the ground at said feeding locations, so that animals have to reach over or through a respective fence to get to the feed at the feeding location. This creates a safe area for the first mobile device to move along the feeding locations without interfering with the animals.

FIG. 2 depicts schematically a side view of the first and second mobile device MD1, MD2 of FIG. 1. The first mobile device MD1 comprises a base BS carried by wheels W1, which base BS carries an actuation system AS with a first actuator AC1 to drive one or more of the wheels W1 to move the first mobile device MD1, a second actuator AC2 to drive the feed mixer FM1, and a third actuator AC3 to drive the side door SD1.

The base BS in turn carries the feed holder FH1, the feed mixer FM arranged inside the feed holder FH1, and the feed dispenser in the form of a side door SD1 in a sidewall of the feed holder FH1.

The first mobile device MD1 in this embodiment comprises a grabber GR which allows the first mobile device to gather feed and fill the feed holder FH1 via the open top OP1. After the feed holder FH1 has been filled, the feed mixer FM1 is operated to mix the feed and when the first and second mobile device meet, feed can be dispensed by the first mobile device to the second mobile device by opening the side door SD1 and operating the feed mixer FM1 which then functions as a transportation means.

The second mobile device MD2 comprises a feed holder FH2 with an open top OP2, which feed holder FH2 is supported from the ground G by wheels W2 which are driven by an actuator AC4.

In this embodiment, the feed holder FH2 of the second mobile device is configured such that its open top OP2 is below the side door SD1 of the first mobile device MD1 to allow the first mobile device to dispense feed into the feed holder of the second mobile device.

The second mobile device is smaller in weight than the first mobile device. Additionally or alternatively, one or more dimensions of the second mobile device such as e.g. width, height may be smaller in size than the corresponding one or more dimensions of the first mobile device. This allows the second mobile device to reach feeding locations which are difficult to reach for the first mobile device.

Instead of wheels, the second mobile device may be equipped with a caterpillar to make driving easier.

Figure 3:
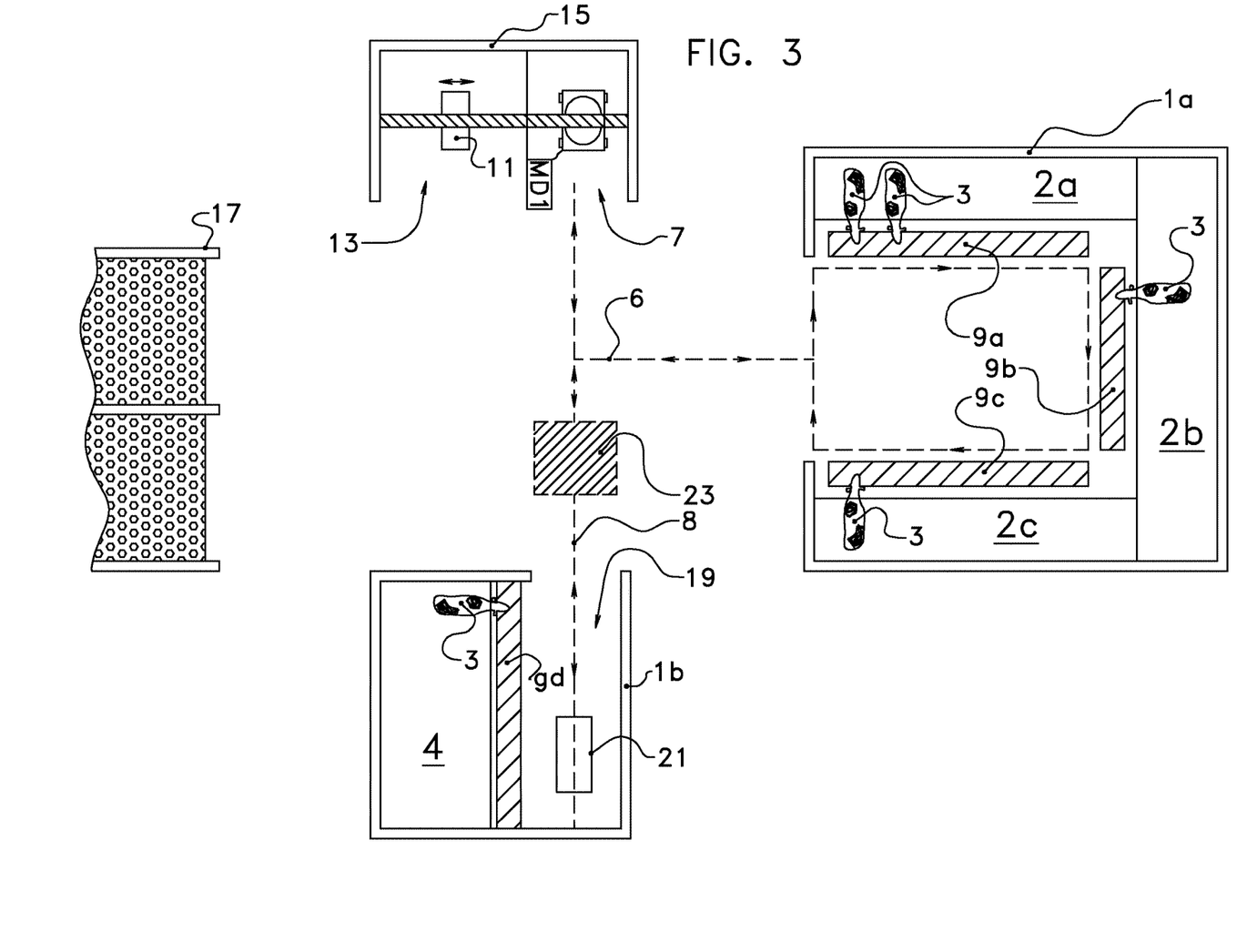
FIG. 3 depicts a schematic top view of a farm with a feeding system according to another embodiment of the invention.

FIG. 3 depicts a schematic top view of a diary farm comprising in this example two barns 1a, 1b to accommodate non-human animals, i.e. cows 3. Only some cows 3 are shown in FIG. 3, but it will be clear that the barns 1a, 1b may accommodate more animals. To feed the cows 3, a feeding system is provided comprising in this embodiment, a first autonomous mobile device MD1 as a feed mixing and delivery device to transport feed between a feed discharge location, i.e. a loading area 7 and one or more feeding locations 9a-9c near cows 3 in the barn 1a. For delivering feed to the one or more feeding locations, the first mobile device MD1 may regularly drive along a route past the feeding locations 9a-9c to determine which feeding locations require feed, places a feed order, is filled with feed and delivers the feed to the feeding locations 9a-9c as will be explained in more detail below.

In this example, the first mobile device MD1 places the feed order at a feed preparation device 11. The feed preparation device 11 is positioned together with the loading area and a feed storage location 13 in a building 15. The feed preparation device is configured to transport feed ingredients from the feed storage location 13 to the loading area 7, in this case by moving along a rail 12, when it receives a feed order from the first mobile device MD1 in order to fill a feed holder of the first mobile device with the ordered composition of feed.

The feed preparation device and the first mobile device may both be autonomous devices controlled by respective control systems that communicate with each other, but that function independently. However, the feed preparation device and the first mobile device may also be controlled by a common control system, such that the combination of feed preparation device and first mobile device is operating autonomously.

The feed preparation device may comprise a gripper to grab feed in the feed storage location and release the grabbed feed at the loading area (feed discharge location).

In order to keep the feed fresh or as fresh as possible, the feed is initially stored in a long term storage like a silo 17 and is subsequently transported, e.g. as bales, to the feed storage location in the building 15.

In the shown embodiment, the barn 1a has three fenced areas, respectively fenced areas 2a, 2b, 2c, where animals can be held in groups separate from the other groups. Although not depicted FIG. 3, these fenced areas include resting beds and walking areas with slatted or closed floors and not the packed bedding of FIG. 1, so that 'heavy traffic' near a feeding fence is not a problem. The animals on a diary farm may be divided into one or more groups, like milking cows, high and low yielders, heifers, dry cows, etc., each group requiring a different feed composition, i.e. mixed feed ration.

Each fenced area has an associated feeding location 9a-9c where feed is provided for the animals to eat. The feeding location are located outside the fenced areas so that animals have to reach over or through a respective fence to get to the feed at the feeding location. This creates a safe area for the first mobile device to move along the feeding locations without interfering with the animals. The feeding locations may alternatively be located inside fenced areas, in which case safety may be maintained by using an overhead guiding system along which a mobile device can be transported above the feeding locations without interfering with the animals. In this embodiment, the first mobile device MD1 further comprises a feed mixer (not shown) of similar configuration as shown in FIG. 2 for another embodiment. The feed mixer is configured to mix feed. The first mobile device MD1 further comprises a feed dispenser (not shown), which may be of similar configuration as shown in FIG. 2, to dispense feed from the first mobile device to one or more feeding locations 9a-9c.

FIG. 3 shows in dashed lines a route 6 that may be taken by the first mobile device during a run/feeding round past the feeding locations 9a-9c. In this embodiment, the first mobile device first moves/drives to feeding location 9a and subsequently passes feeding locations 9b and 9c before leaving the barn 1a. Every time the first mobile device makes a feeding round, feed may be swept at each feeding location and the height of the feed may be measure to determine whether a feeding location requires feed in a next feeding round. An outcome of a feeding round may be that temporarily none of the feeding locations 9a-9c have a feeding requirement. Hence, in principle no next feeding round will be planned based on delivering feed. However, the system may be configured, i.e. programmed, such that at regular intervals, the first mobile device makes a run past the feeding locations 9a-9c to determine whether there are feeding locations having a feed requirement.

The barn 1b comprises a fenced area 4, wherein a group of cows are held. The fenced area 4 comprises a feeding location in the form of a trough or manger 9d arranged at a distance from the floor of the barn 1b.

Next to the feeding location 9d, a relatively small alley 19 allows to reach the feeding location 19. This alley 19 is too small to allow the first mobile device to reach the feeding location 9d. However, in this embodiment, even if the first mobile device would be able to reach the feeding location, it cannot dispense feed into the trough or manger 9d as it is at an elevated height.

In order to automatically deliver feed to the feeding location 9d, the feeding system further comprises a second autonomous mobile device 21 configured to deliver feed to the feeding location 9d. The second mobile device 21 is shown in more detail in FIGS. 4A and 4B.

Figure 4A:
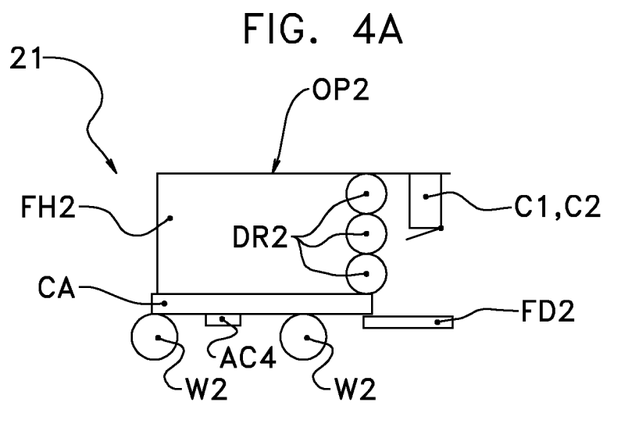
FIG. 4A depicts a schematic side view of the second autonomous mobile device of the feeding system of FIG. 3.
Figure 4B:
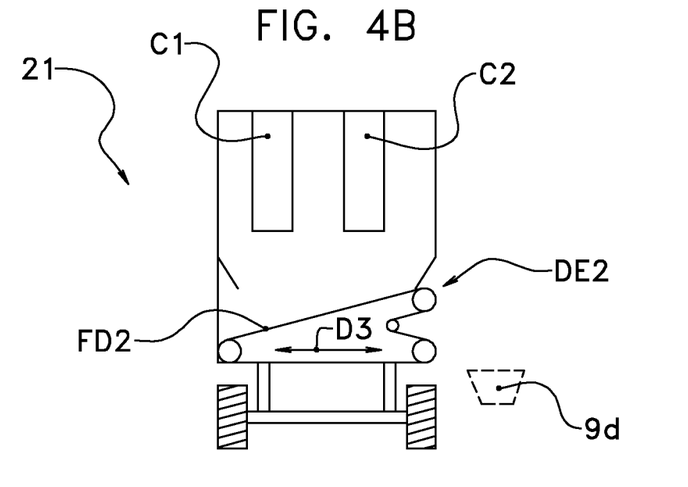
FIG. 4B depicts a schematic front view of the second autonomous mobile device of FIG. 4A.

In FIGS. 4A and 4B it is shown that the second mobile device 21 comprises a cart CA with wheels W2 and an actuator AC4 to drive the wheels W2. The cart CA supports a feed holder FH2 to receive feed from the first mobile device via its open top OP2. As the first mobile device may be configured to dispense feed on the ground, the second mobile device may drive to a lower location, so that the open top OP2 gets more or less at ground level and the first mobile device is able to dispense feed into the feed holder FH2 of the second mobile device. Another solution would be to dispense feed onto the ground and use a grabber as shown in FIG. 2 to deliver feed from the ground into the feed holder of the second mobile device.

The second mobile device further comprises a feed dispenser FD2 to dispense feed at feeding location 9d. The feed dispenser FD2 is in this embodiment embodied as an endless belt which is configured to receive feed discharged from the feed holder FH2 by distribution roles DR2, and to dispense the feed by rotating the endless belt such that it falls over the edge at a dispensing end DE2. In this embodiment, the feed dispenser FD2 is moveable in a direction D3 transverse to a normal driving direction of the second mobile device. This allows the feed dispenser move sideways to extend over the trough 9d, dispense the feed into the trough and retract again.

The feed dispenser of the second mobile device being moveably arranged on the second mobile device can additionally or alternatively be used to provide a variable dispensing location relative to the mobile device. Hence, the feed dispenser, in this case, is moveable between a retracted position as shown in FIG. 4B and an extended position, and one or more intermediate positions in between the retracted and extended positions, thus varying the actual location where the feed is dispensed.

Referring again to FIG. 3, the second mobile device 21 is small enough to manoeuvre in alley 19. This is also due to the moveable feed dispenser which keeps the transversal dimension of the second mobile device within limits.

The second mobile device 21 is able to move along route 8, which route runs next to the feeding location 9d and terminates at one end in a feed exchange zone 23. The first mobile device is also able to reach the feed exchange zone outside the barn 1b, so that in this feed exchange zone, the first and second mobile device can meet each other, and the first mobile device can dispense feed from its feed holder to the feed holder of the second mobile device.

As described above, the feed exchange zone may be configured such that the second mobile device drives to a lower location compared to the location of the first mobile device such that the first mobile device can deliver feed via the open top of the second mobile device while the first mobile device is dispensing feed as if it were dispensing feed at a feeding location on the ground.

Alternatively a transport belt is provided in the feed exchange zone 23 onto which the first mobile device MD1 can discharge the mixed feed. The transport belt can be configure to have a horizontally extending portion and an upwardly angled portion. The belt ending at the upwardly angled portion having a height which is high enough to end above the second mobile device such that it can be filled. Advantageously the horizontal portion of the belt acts as a buffer for feed that is discharged from mobile device MD1, but not yet needed to fill the second mobile device (MD2, 21). Thus the belt may also function as a storage location for mixed feed for the second mobile device. By having a storage location for feed mixed by the first mobile device the capacity of the system increases, because the first mobile device can discharge the mixed feed and start a next task even when the second mobile device is not yet able to receive the mixed feed.

Referring again to FIGS. 4A and 4B, the second mobile device further comprises a feed additive supplying device, in this embodiment in the form of two containers C1 and C2. These containers may contain feed additives that can be supplied to the mixed feed on the endless belt and subsequently be delivered to the feeding location along with the rest of the feed.

The containers C1 and C2 are therefore supported above the feed dispenser FD2.

The second mobile device MD2 may also be able to dispense feed into mangers for individual animals, e.g. a manger for a sick animal in a quarantine or separation area.

Both the first and second mobile devices in the above described examples are autonomous devices, which means that they function independently from the farmer or other persons and thus no interventions from a person are required during normal operation, only maybe in rare abnormal situations.

Hence, the feeding system comprises at least one control system for autonomously controlling the feeding system. In an embodiment as shown in FIG. 5, there is provided a control system with independently functioning control units that communicate with each other as will be explained below.

Figure 5:
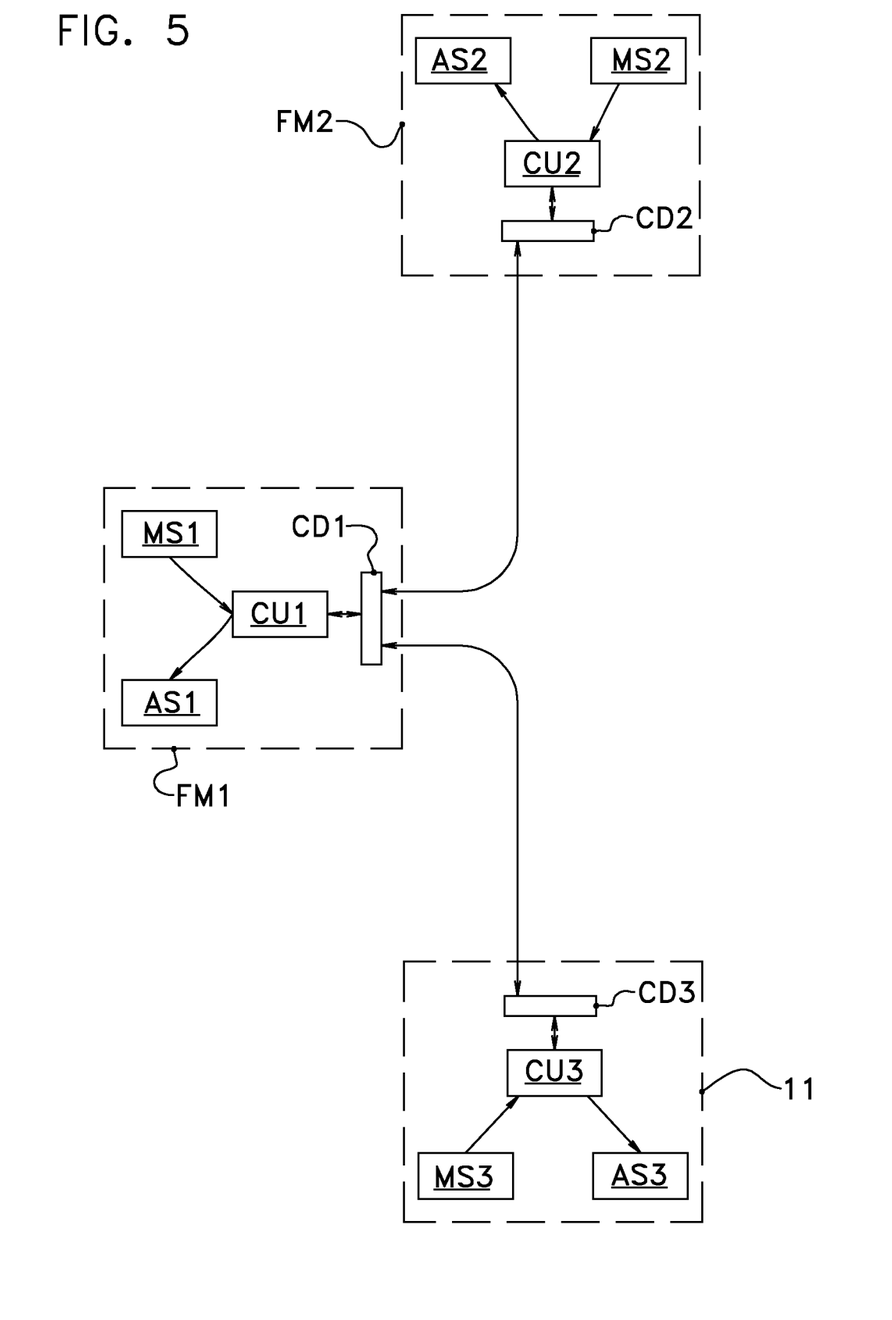
FIG. 5 depicts schematically a suitable control configuration for a feeding system according to an embodiment of the invention.

FIG. 5 depicts schematically a first mobile device FM1, a second mobile device FM2 and a feed preparation device 11. Hence, this control configuration is especially suitable for a feeding system in accordance with FIG. 3.

The first mobile device is a first autonomous mobile device in accordance with the invention and comprises a first measurement system MS1, a first actuation system AS1, a first control unit CU1 and a first communication device CD1.

The second mobile device is a second autonomous mobile device in accordance with the invention and comprises a second measurement system MS2, a second actuation system AS2, a second control unit CU2 and a second communication device CD2.

The feed preparation device 11 is configured to deliver feed from a feed storage to a feed discharge location to fill the first mobile device FM1 with feed as for instance depicted in FIG. 3. The feed preparation device 11 comprises a third measurement system MS3, a third actuation system AS3, a third control unit CU3 and a third communication device CD3.

Each of the control units CU1, CU2, CU3 is pre-programmed with instructions to be carried out by the respective device FM1, FM2, 11.

The first control unit CU1 is configured to send drive signals to the first actuation system AS1 to at least control the operation of a feed mixer to mix feed, a feed dispenser to dispense feed, and a motion device to move the first mobile device FM1. The first control unit CU1 is further configured to determine the drive signals based on measured parameters provided by the first measurement system MS1 and/or on signals received by the first communication device CD1 from the second mobile device and/or the feed preparation device.

The first control unit CU1 may further be configured to send signals to the second and/or third control unit via the first communication device CD1. Said signals may also be determined based on measured parameters provided by the first measurement system MS1 and/or signals received by the first communication device CD1.

The second control unit CU2 is configured to send drive signals to the second actuation system AS2 to at least control the operation of a motion device to move the second mobile device FM2. Other devices may also be controlled by the second control unit CU2, such as a feed dispenser to dispense feed and/or a feed additive supply device to supply feed additives to the feed.

The second control unit CU2 is further configured to determine the drive signals based on measured parameters provided by the second measurement system MS2 and/or on signals received by the second communication device CD2 from the first mobile device and/or the feed preparation device.

The second control unit CU2 may further be configured to send signals to the first and/or third control unit via the second communication device CD2. Said signals may also be determined based on measured parameters provided by the second measurement system MS2 and/or signals received by the second communication device CD2.

The third control unit CU3 is configured to send drive signals to the third actuation system AS3 to at least control the operation of a grabber to grab feed and a motion device to move the feed preparation device 11. The third control unit CU3 is further configured to determine the drive signals based on measured parameters provided by the third measurement system MS3 and/or on signals received by the third communication device CD3 from the first mobile device and/or the second mobile device.

The third control unit CU3 may further be configured to send signals to the first and/or second control unit via the third communication device CD3. Said signals may also be determined based on measured parameters provided by the third measurement system MS3 and/or signals received by the third communication device CD1.

Communication between the communication devices CD1, CD2, CD3 is preferably carried out in a wireless fashion, but may also occur via solid wires or a combination thereof.

Below an example will be described of feeding animals of the farm shown in FIG. 3 with a control system according to FIG. 5.

Feeding starts with a feed requirement at one or more feeding locations 9a-9d, see FIG. 3. A feed requirement can be determined based on a feeding schedule and a timer, wherein feeding has to take place at specific times or time intervals, and can be determined by measuring the amount of feed at a feeding location and comparing this amount with a predetermined threshold, wherein feeding has to take place when the measured amount of feed is below the predetermined threshold.

Measuring the amount of feed at a feeding location can be done in several ways. The first and/or second mobile device FM1, FM2 may be equipped with sensors for measuring the amount of feed at a feeding location while passing said feeding location, but measuring may also be carried out using a separate local measurement system e.g. using a camera system or weighing sensor. It is also possible that a person, e.g. the farmer, regularly checks the amount of feed present at a feeding location and provides an input to the control system when said person determines that feeding is required at a feeding location.

Based on where a feed requirement enters the control system, the following may occur:

If a feed requirement is determined at the first mobile device by the first control unit CU1, this first control unit will preferably also determine a required feed composition corresponding to the feeding location having a feed requirement. The first mobile device will then send a feed request to the feed preparation device 11 and drive to the feed discharge location. The feed request may contain information about the amount of feed and the feed composition, or other information allowing the third control unit CU3 of the feed preparation device to determine these parameters. When arriving at the feed discharge location, the third control unit of the feed preparation device will ensure that the feed holder of the first mobile device is filled with feed in accordance with the feed request. The first mobile device is then able to drive to the feeding location requiring feed and deliver the feed.

If a feed requirement is determined at the second mobile device by the second control unit CU2, the second control unit will send a feed request to either the first mobile device which then relays the feed request to the feed preparation device and drives to the feed discharge location or will send the feed request to the feed preparation device which then sends a signal to the first mobile device to move the first mobile device to the feed discharge location. The first mobile device is then filled with feed of the required feed composition by the feed preparation device and subsequently the first mobile device and the second mobile device are moved to each other. In the embodiment of FIG. 3, the first and second mobile device both move to the feed exchange zone 23. The feed is then transferred from the first mobile device to the second mobile device, after which the second mobile device drives to the feeding location 9d and delivers the feed.

If a feed requirement is determined at the feed preparation device by the third control unit, for instance because the feed schedule and timer are present in the third control unit, the third control unit will always summon the first mobile device to come to the feed discharge location for receiving feed prepared by the feed preparation device. After filling the feed holder of the first mobile device, the first mobile device will deliver the feed to one or more feeding locations 9a-9c and/or to the second mobile device. In case of the latter either the first mobile device or the feed preparation device will communicate this to the second mobile device.

The invention claimed is:

1. A feeding system to feed non-human animals, comprising:
   a first autonomous mobile device; and
   a second autonomous mobile device,
   wherein the first autonomous mobile device includes:
   a feed holder to receive feed through a first opening;
   a feed mixer to mix the received feed;
   a feed dispenser configured to dispense feed to the second autonomous mobile device through a second opening spaced from the first opening;
   a control system for controlling the first autonomous mobile device and the second autonomous mobile device, the control system receiving a feed request from the second autonomous mobile device and sending a command to the first autonomous mobile device to deliver feed to the second autonomous mobile device after receiving the feed request from the second autonomous mobile device; and
   a feed storage location, a feed discharge location and a feed preparation device,
   wherein the feed preparation device is configured to deliver feed from the feed storage location to the feed discharge location to fill the first autonomous mobile device,
   wherein the second autonomous mobile device includes a feed holder to receive feed from the first autonomous mobile device, and
   wherein the second autonomous mobile device is smaller than the first autonomous device.

2. The feeding system according to claim 1, wherein the second autonomous mobile device comprises a feed dispenser to dispense feed at one or more feeding locations.

3. The feeding system according to claim 2, wherein the feed dispenser of the first autonomous mobile device is configured to deliver feed at a first group of feeding locations, wherein the feed dispenser of the second autonomous mobile device is configured to deliver feed to a second group of feeding locations, and wherein the first and second group of feeding locations are different.

4. The feeding system according to claim 2, wherein the feed dispenser of the second autonomous mobile device comprises an endless belt conveyor.

5. The feeding system according to claim 4, wherein a portion of the endless belt conveyor forms the feed holder.

6. The feeding system according to claim 1, wherein the feed dispenser of the first autonomous mobile device is configured to dispense feed at one or more feeding locations.

7. The feeding system according to claim 1, wherein the first autonomous mobile device comprises a feed grabber to grab feed in order to fill the feed holder of the first autonomous mobile device.

8. The feeding system according to claim 1, wherein the second autonomous mobile device comprises a feed additive supplying device to supply feed additives to the feed.

9. The feeding system according to claim 1, wherein the feed dispenser of the second autonomous mobile device is moveably arranged on the second autonomous mobile device to provide a variable dispensing location for said feed dispenser that can be adapted to the position of a feeding location.

10. A method for feeding non-human animals, comprising the following steps:
- providing a first autonomous mobile device including a feed holder, a feed mixer, and a feed dispenser;
- providing a second autonomous mobile device including a feed holder;
- sending a feeding request from the second autonomous mobile device to the first autonomous mobile device;
- sending a response to the feeding request from the first autonomous mobile device to the second autonomous mobile device indicating that the requested feed has been prepared by the first autonomous mobile device;
- moving the first and/or second autonomous mobile device until they meet each other for dispensing the mixed feed from the first autonomous mobile device to the feed holder of the second autonomous mobile device;
- filling the feed holder of the first autonomous mobile device with feed through a first opening;
- mixing the feed received in the feed holder of the first autonomous mobile device using the feed mixer;
- dispensing the mixed feed from the first autonomous mobile device through a second opening spaced from the first opening to the feed holder of the second autonomous mobile device at a first location;
- moving the second autonomous mobile device from the first location to at least one feeding location of a feeding lot.

11. The method according to claim 10, wherein said step of filling the feed holder of the first autonomous mobile device with feed further comprises the steps of:
- moving the first autonomous mobile device to a predetermined filling location; and
- grabbing feed using a feed grabber of the first autonomous mobile device to fill said feed holder or receiving feed from a feed preparation device.

12. The method according to claim 10, further including the step of dispensing mixed feed from the first autonomous mobile device at one or more feeding locations of the feed lot using the feed dispenser of the first autonomous mobile device.

13. The method according to claim 12, wherein the feed dispenser of the first autonomous mobile device delivers feed at a first group of feeding locations of the feed lot,
- wherein the feed dispenser of the second autonomous mobile device delivers feed to a second group of feeding locations of the feed lot, and
- wherein the first and second group of feeding locations are different.

14. The method according to claim 10, wherein the second autonomous mobile device comprises a feed dispenser, and wherein the method further includes the step of dispensing feed from the second autonomous mobile device at the at least one feeding location of the feed lot using said feed dispenser.

15. The method according to claim 10, further comprising the steps of:
- sending a notification from the first autonomous mobile device to the second autonomous mobile device that feed has been prepared by the first autonomous mobile device;
- sending a response to the notification from the second autonomous mobile device to the first autonomous mobile device indicating that the second autonomous mobile device is prepared to receive feed from the first autonomous mobile device.

* * * * *